United States Patent
Bravo et al.

(10) Patent No.: US 11,143,055 B2
(45) Date of Patent: Oct. 12, 2021

(54) METHOD OF MONITORING A GAS TURBINE ENGINE TO DETECT OVERSPEED EVENTS AND RECORD RELATED DATA

(71) Applicant: Solar Turbines Incorporated, San Diego, CA (US)

(72) Inventors: Eduardo Bravo, La Mesa, CA (US);
Brian J. Taylor, Poway, CA (US);
John S. Bowen, San Diego, CA (US);
Bruno E. Struck, San Diego, CA (US);
Hyun D. Kim, San Diego, CA (US);
Frederick B. Lorenz, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 59 days.

(21) Appl. No.: 16/510,752

(22) Filed: Jul. 12, 2019

(65) Prior Publication Data

US 2021/0010388 A1    Jan. 14, 2021

(51) Int. Cl.
*G01M 15/14* (2006.01)
*F01D 21/00* (2006.01)
*F01D 21/02* (2006.01)

(52) U.S. Cl.
CPC .......... *F01D 21/003* (2013.01); *F01D 21/02* (2013.01); *G01M 15/14* (2013.01); *F05D 2270/021* (2013.01)

(58) Field of Classification Search
CPC .................................................. G01M 15/14
See application file for complete search history.

(56) References Cited

U.S. PATENT DOCUMENTS

| | | |
|---|---|---|
| 3,686,860 A | 8/1972 | White |
| 4,368,616 A | 1/1983 | Abo et al. |
| 4,370,560 A | 1/1983 | Faulkner et al. |
| 4,954,974 A | 9/1990 | Howell, IV |
| 6,760,687 B2 | 7/2004 | Apel et al. |
| 6,993,246 B1 | 1/2006 | Pan et al. |
| 8,020,021 B2 | 9/2011 | Bengtson |
| 8,365,005 B2 | 1/2013 | Bengtson et al. |
| 9,303,565 B2 | 4/2016 | Fichtner et al. |
| 10,151,215 B2 | 12/2018 | Di Raimondo et al. |
| 2014/0280448 A1 | 9/2014 | Mutschler |
| 2015/0112640 A1 | 4/2015 | Niro et al. |
| 2015/0213706 A1 | 7/2015 | Bai et al. |
| 2016/0179936 A1 | 6/2016 | Mathur et al. |
| 2017/0037742 A1 | 2/2017 | Schiff |
| 2017/0038275 A1 | 2/2017 | Schiff |

FOREIGN PATENT DOCUMENTS

EP    2172824 B1    7/2010

*Primary Examiner* — Eric S. McCall
(74) *Attorney, Agent, or Firm* — Procopio, Cory, Hargreaves & Savitch LLP (57) ABSTRACT

A control system for a gas turbine engine is disclosed. In embodiments, control system includes a controller and a high speed recorder. The controller obtains a sensor value from a sensor connected to the gas turbine engine and publishes a tag that includes the type of event, the sensor value, and a timestamp. The high speed recorder checks the tag for an overspeed event. If an overspeed event is detected, the high speed recorder records values provided by the tag.

20 Claims, 3 Drawing Sheets

METHOD OF MONITORING A GAS TURBINE ENGINE TO DETECT OVERSPEED EVENTS AND RECORD RELATED DATA

TECHNICAL FIELD

The present disclosure generally pertains to gas turbine engines, and is directed toward a method for speed excursion data acquisition for a gas turbine engines.

BACKGROUND

Gas turbine engines include compressor, combustor, and turbine sections. Gas turbine engines also include a control system that, inter alia, monitors the gas turbine engine systems.

U.S. Pat. No. 10,151,215 to Raimondo et. al. describes a control system for a gas turbine engine. In embodiments, the control system includes a controller and a high speed recorder. The controller obtains sensor values from sensors connected to the gas turbine engine and publishes a map of trigger thresholds. The high speed recorder reads the sensor values from the controller. The high speed recorder checks a map header for a change to the map header on a predetermined map reading interval, sets a flag when the map header has changed, and reads the map during the next loop of the map reading interval. The control system maintains timestamps assigned for the sensor values and to the trigger thresholds on the same temporal axis.

The present disclosure is directed toward overcoming one or more of the problems discovered by the inventors or that is known in the art.

SUMMARY

Methods of monitoring a gas turbine engine are disclosed herein. In embodiments, the method includes logging a gas producer rotor speed obtained from a sensor and a timestamp associated with the gas producer rotor speed. The method further includes detecting a start of an overspeed event if the gas producer rotor speed exceeds a trigger threshold. The method further includes in response to detecting the start of the overspeed event, detecting an end of the overspeed event if the gas producer rotor speed falls below a setpoint threshold. The method further includes in response to detecting the overspeed event, generating the tag to include an overspeed event value, the gas producer rotor speed, and the timestamp. The method further includes reading the tag to detect the overspeed event. The method further includes in response to detecting the overspeed event, recording a plurality of tags including the overspeed event value, the gas producer rotor speed, the timestamp, from the start of the overspeed event to the end of the overspeed event.

DETAILED DESCRIPTION

The system and methods disclosed herein include a control system for controlling and monitoring a high speed rotary machine, such as a gas turbine engine. While the embodiments of the system and methods describe a gas turbine engine, the system and methods can be used with other high speed rotary machines, such as diesel and gas engines. In embodiments, the control system includes a controller and a high speed recorder. The controller samples a sensor connected to the gas turbine engine, and monitors the gas turbine engine for events. The high speed recorder obtains the sensor and event data from the controller and maintains timestamps associated with the sensor and event data.

Figure 1:
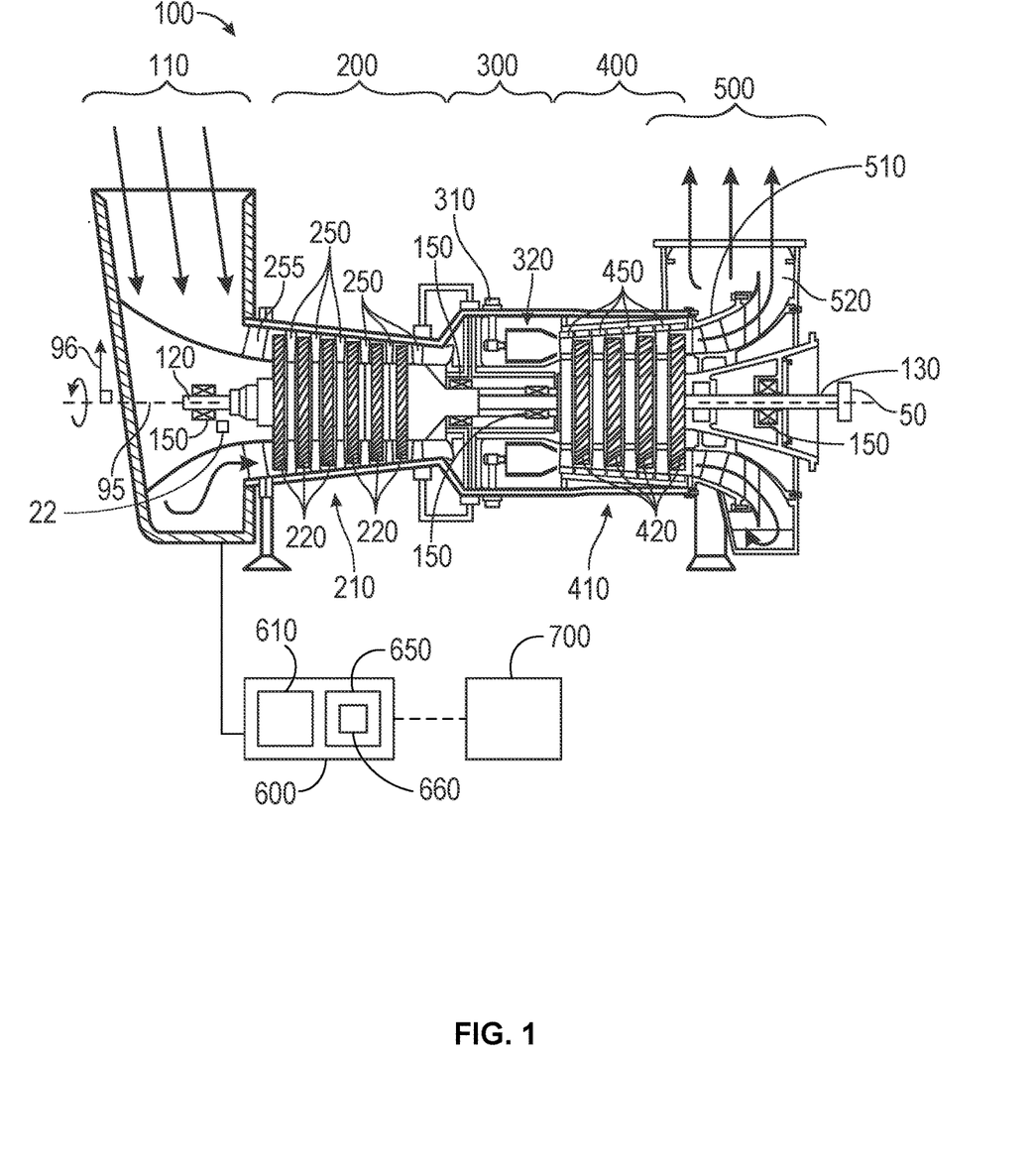
FIG. 1 is a schematic illustration of an exemplary gas turbine engine.

FIG. 1 is a schematic illustration of an exemplary high speed rotary machine. In the embodiment illustrated, the high speed rotary machine is a gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow direction, and aft is "downstream" relative to primary air flow direction.

In addition, the disclosure may generally reference a center axis 95 of rotation of the gas turbine engine, which may be generally defined by the longitudinal axis of its compressor shaft 120 and power turbine shaft 130 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a compressor shaft 120, a gas producer or compressor 200, a combustor 300, a turbine 400, an exhaust 500, and a power output coupling 50. The gas turbine engine 100 may have a dual shaft configuration with a power turbine shaft 130 separate from the compressor shaft 120 or have a single shaft configuration with the power turbine shaft 130 and compressor shaft 120 forming portions of one shaft.

The compressor 200 can include a compressor rotor assembly 210, compressor stationary vanes ("stators") 250, and inlet guide vanes 255. The compressor rotor assembly 210 (also referred to as the compressor rotor) mechanically couples to compressor shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more fuel injectors 310 and a combustion chamber 320.

The turbine 400 includes a turbine rotor assembly 410 and turbine nozzles 450. The turbine rotor assembly 410 can mechanically couple to the compressor shaft 120 and the turbine shaft 130. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. A turbine nozzle 450, such as a nozzle ring, axially precedes each of the turbine disk assemblies 420. Each turbine nozzle 450 includes multiple methods grouped together to form a ring. Each turbine disk assembly 420 paired with the adjacent turbine nozzle 450 that precede the turbine disk assembly 420 is considered a turbine stage. Turbine 400 includes multiple turbine stages.

The exhaust 500 includes an exhaust diffuser 510 and an exhaust collector 520.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

The gas turbine engine 100 also includes a sensor that can be used to monitor and control the gas turbine engine 100. The sensor may include a shaft speed sensor 22. The shaft speed sensor 22 may be used to measure the rotational speed of the compressor rotor assembly 210, also referred to as gas producer rotor speed (NGP). In a dual shaft configuration, a separate sensor may be used to measure the power turbine rotor rotational speed (NPT).

The gas turbine engine 100 also includes a control system 600. Control system 600 includes a controller 610 and a human machine interface (HMI) 650. The controller 610 can be configured to obtain the values from the sensor connected to the gas turbine engine 100 to monitor and control the gas turbine engine 100. The controller 610 may monitor the gas turbine engine 100 for events, such as a sudden increase or decrease in compressor rotor assembly 210 speed.

In one embodiment, the control system 600 is implemented using one or more processors, memory and software. The controller 610 may use the shaft speed sensor 22 to determine which type of event is occurring such as a normal operation event or an overspeed event or may be alerted to an overspeed event by another process of the gas turbine engine 100.

The start of an overspeed event can be defined as beginning once a trigger threshold is exceeded and end once a setpoint threshold is met. The trigger threshold and the setpoint threshold can be defined with respect to the NGP measured by the shaft speed sensor 22. In an example, the trigger threshold can be exceeded if the shaft speed sensor 22 measures a NGP larger than 100% of a predetermined maximum design speed of the gas producing rotor, sometimes referred to as maximum design speed.

The end of an overspeed event can be defined once NGP is less than a setpoint threshold. In an example, the setpoint threshold can be crossed if there is an overspeed event currently active and if the NGP is less than 100% of a predetermined maximum design speed of the gas producing rotor.

In an embodiment there can be multiple levels of overspeed events defined to represent different levels/magnitudes of overspeed events. For example there can be a level one overspeed event, a level two overspeed event, and a level three overspeed event. In an example the level three overspeed event begins at a higher NGP than a level one and level two overspeed events. This means that level one and level two overspeed events are occurring, during the level three over speed event.

Each overspeed event level can have a respective trigger threshold level. For example there can be a level one trigger threshold, a level two trigger threshold, and a level three trigger threshold. In an example, the level one trigger threshold can occur at an NGP of 101.5% of the maximum design speed, the level two trigger threshold can occur at an NGP of 103.75% of the maximum design speed, and the level three trigger threshold can occur at an NGP of 105% of the maximum design speed. In other examples the trigger threshold levels can be set to occur at a wide variety of NGP and NGP percentage values with respect to the maximum design speed. Though three levels of trigger thresholds have been described there can be four, five, six, seven, eight, nine or more levels trigger thresholds. During operation of the gas turbine engine 100, there can be multiple level one, level two, and level three trigger thresholds exceeded. For example, a first level one trigger threshold, a second level one trigger threshold, a third level one trigger threshold and so on.

Each trigger threshold can represent a start of an overspeed event, which can be accompanied by a setpoint threshold that represents an end of the overspeed event.

In an embodiment there are multiple setpoint threshold levels such as a level one setpoint threshold, a level two setpoint threshold, and a level three setpoint threshold. In an example, the level one setpoint threshold can occur at an NGP of 101% of the maximum design speed, the level two setpoint threshold can occur at an NGP of 103.25% of the maximum design speed, and the level three setpoint threshold can occur at an NGP of 104.5% of the maximum design speed. In an example, the setpoint threshold is generally 0.5% less than the respective trigger threshold. In an example, the setpoint threshold is generally 1.0% less than the respective trigger threshold.

Though three levels of setpoint thresholds have been described there can be four, five, six, seven, eight, nine or more levels of setpoint thresholds. During operation of the gas turbine engine 100, there can be multiple level one, level two, and level three setpoint thresholds exceeded. For example, a first level one setpoint threshold, a second level one setpoint threshold, a third level one setpoint threshold, and so on.

In an embodiment the normal operating event occurs during normal operation of the gas turbine engine, such as a NGP between 94% and 100% of maximum design speed of the compressor rotor. In other examples, the NGP is generally 100% of the maximum design speed during normal operation of the gas turbine engine. In an example the upper end of the normal operation of the gas turbine engine 100 extends to the trigger threshold, and the gas turbine engine 100 returns to normal operation status once the NGP falls below the setpoint threshold.

In some embodiments, the HMI 650 includes a high speed recorder (HSR) 660 that is configured to obtain and log the NGP values (also sometimes referred to as values) of the shaft speed sensor 22 and of the events recorded by the controller 610, including overspeed events, normal operation, and other events, such as events related to the operating cycle of the gas turbine engine (start-up, shut-down, change of load, etc.). In other embodiments, the HSR 660 may be included in a device connected to the controller 610. The HMI 650 may be connected to a monitoring system 700. The monitoring system 700 may be temporarily connected to the HMI 650 by a field engineer to obtain the information logged by the HSR 660 and to analyze and diagnose any issues with the gas turbine engine 100. In some embodiments the HMI 650 is connected to a monitoring system 700 over a network to allow for remote monitoring and diagnostics of the information logged by the HSR 660. The remote monitoring can occur on or offsite relative to the gas turbine engine 100.

Figure 2:
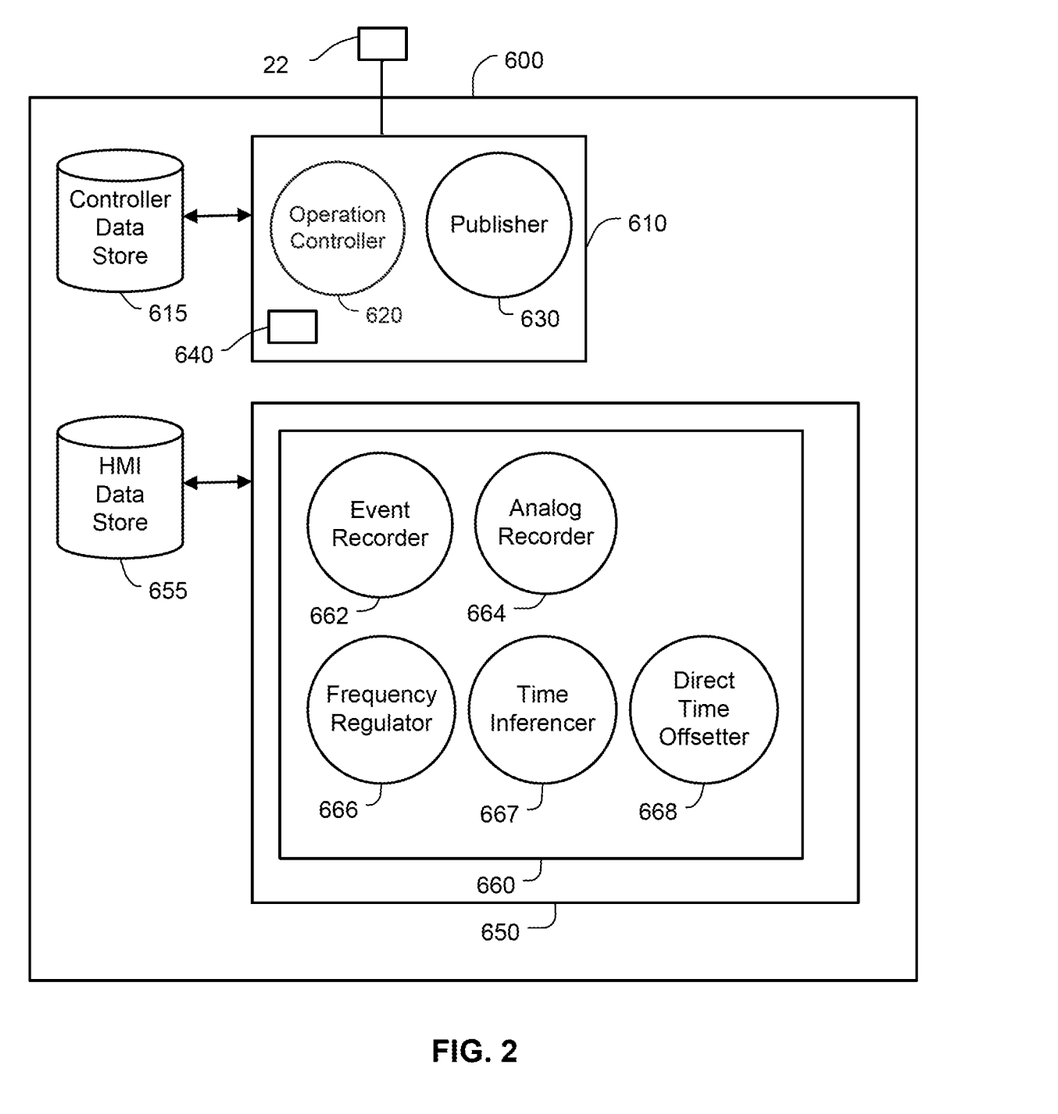
FIG. 2 is a functional block diagram of the control system of FIG. 1.

FIG. 2 is a functional block diagram of the control system 600 of FIG. 1. The controller 610 may include an operations controller 620 and a publisher 630. The operations controller 620 is configured to control the gas turbine engine 100 during operation of the gas turbine engine 100. The operations controller 620 may use the values obtained from various sensors to control the gas turbine engine 100.

The publisher 630 is configured to log an array related to, inter alia, each event type, and the NGP values obtained from the shaft speed sensor 22. The event type can designate normal operating conditions and overspeed conditions such as when an overspeed event starts, an overspeed event ends, during the overspeed event, and different level of overspeed events.

A tag may be assigned to, inter alia, each event type to identify the recorded NGP value, an associated time stamp, and the type of event occurring. The tag may include cumulative counter values associated with the total number of times each overspeed event level has been experienced by the gas turbine engine. Each tag may be associated with a unique identifier to identify the associated tag. Each unique identifier may be associated with an event type, a timestamp and a recorded NGP value within the array. The unique identifier may be a numeric number used to identify the tag. The tags may be unique to a given gas turbine engine 100.

The timestamp is a temporal value, such as the date and time of day, when the event occurred and when the NGP value was sampled. In some embodiments, the publisher 630 records timestamps based on the controller clock 640 for the events and not for the values obtained from the shaft speed sensor 22. In some embodiments, the controller 610 reads timestamps based on the controller clock 640 for the NGP values obtained from the shaft speed sensor 22. These NGP values and respective timestamps can be temporarily stored within a controller data store 615 of the control system 600 for a predetermined time limit. For example the NGP values and respective timestamps during a normal operating event can be temporarily stored for one hour within the controller data store 615 before being incrementally purged with new values. The time limit for the temporarily stored values can be increased or decreased.

The HSR 660 can begin reading tags from the publisher 630 once an overspeed event is detected. The HSR 660 can record the tag published while an overspeed event value is present in the tag. If an overspeed event occurs, the temporary values stored on the controller data store 615 can be recorded by the HSR 660. For example, if an overspeed event occurs, the HSR 660 can log all previously temporarily stored values and data tags from 1 minute prior to the timestamp of the start of the overspeed event when the trigger threshold was exceeded. When the NGP falls below the setpoint threshold and the overspeed event ends, the HSR 660 can continue logging all values and data tags from 15 mins after the setpoint threshold.

For NGP values obtained from the shaft speed sensor 22, the recorded value may be a floating point value obtained from the shaft speed sensor 22. In embodiments, these values are analog values obtained from the shaft speed sensor 22.

When an event occurs, the unique identifier, an offset to uniquely determine the timestamp, and the recorded NGP value may be packed into 32 bit words, which may then be packed into the array. When the shaft speed sensor 22 is sampled, the recorded value may be stored into a 32 bit word, which may then be packed into the array.

In some embodiments, the array may be separated into an event array and into an analog value array. The unique identifiers, the timestamps, and the event types are packed into the event array, the recorded values for the shaft speed sensor 22 are packed into the analog value array.

The publisher 630 can be configured to publish a tag of the event that occurred within the last timeframe of a predetermined interval. The tag includes a tag timestamp. The tag timestamp is the time of the controller clock 640 when the tag is published. This tag can also include the unique identifiers, the event type and an offset for each event. The offset for each event can be the amount of time at which the event was recorded with respect to the tag timestamp. In some embodiments, the offset is provided in milliseconds.

The HSR 660 includes an event recorder 662, an analog recorder 664, a frequency regulator 666, a time inferencer 667, and a direct time offsetter 668. In a homogenous sampling system, all timestamps should refer to the same temporal axis. The various processes of the HSR 660 are configured to create a virtual time axis that emulates the controller clock 640 of the controller 610 to maintain all timestamps on the same temporal axis. The HSR 660 can limit the number of events reported. For example after 20 overspeed events have occurred, each recorded subsequent overspeed event can push out the oldest overspeed event.

The event recorder 662 can be configured to read the tag as soon as it is published by the publisher 630. The event recorder 662 checks the tag at a predetermined interval and looks for an overspeed event type. The predetermined interval can be at a relatively high frequency, such as once every 100 milliseconds, compared to the interval that the publisher 630 publishes the tag. If the tag event type changes from a normal operation event value to an overspeed event value, the event recorder 662 sets a flag which enables the recording of the entire tag.

The event recorder 662 can record an overspeed event duration and number of overspeed events. The event recorder 662 can continuously record the overspeed events and provide an overall event counter that is incremented each time an event occurs. For example, if a first level one overspeed event, a second level one overspeed event, and a third level one overspeed event occurs, the overall event counter would equal three. If a fourth level one overspeed event occurs, the overall event counter increases to four. The event recorder 662 can continuously record the overspeed events of each overspeed event level. For example, if a first level one and a first level two overspeed event occurs, the overall event counter would equal one and the second level event counter would equal one and, for this example, the third level event counter would equal zero.

The overspeed event duration can be the time between the start of the overspeed event and the end of the overspeed event. The event recorder 662 can record the event duration of multiple overspeed events.

For example, the overspeed event duration for a first level one overspeed event, a second level one overspeed event, and a third level one overspeed event. The event recorder 662 can maintain the overall accumulative event duration for the trigger thresholds and setpoint thresholds. For example, the overall accumulative duration for all level one trigger thresholds and level one setpoint thresholds.

The analog recorder 664 may operate in parallel with the event recorder 662. The analog recorder 664 can read the values obtained for the shaft speed sensor 22 from the controller 610 or the published tag on a predetermined interval, such as once every 100 milliseconds. The analog recorder 664 assigns a timestamp to each value obtained from the controller 610 based on the following formula:

$$T_a = T_{cF} - \frac{T_{cF} - T_{cR}}{2}$$

where $T_a$ is the timestamp assigned, $T_{cF}$ is the time on the virtual time axis at which the values are received by the HMI 650, and $T_{cR}$ is the time on the virtual time axis at which the request to read the values was sent.

The analog recorder 664 can record the maximum NGP experienced by the gas turbine engine, once a level one trigger threshold is detected.

Latencies in the operating system of the HMI 650 may affect the exact rate at which the direct time offsetter 668 reads the values obtained from the shaft speed sensor 22 from the controller 610 or published tag. The frequency regulator 666 is configured to evaluate the exact time that the analog recorder 664 reads these values. The frequency regulator 666 maintains an average cycle time between readings of the values obtained for the shaft speed sensor 22 from the controller 610 over a predetermined number of cycles. In one embodiment, the frequency regulator 666 maintains an average cycle time between readings of the values obtained for the shaft speed sensor 22 from the controller 610 or publisher over the last twenty cycles.

If the average is off by a predetermined amount relative to the predetermined interval, than a correction is applied. For example, if the average is greater than the predetermined interval plus the predetermined amount, then the frequency regulator 666 anticipates by a correction amount, the next scheduled time for the analog recorder 664 to read the values; if the average is less than the predetermined interval minus the predetermined amount, then the frequency regulator 666 postpones, by the correction amount, the next scheduled time for the analog recorder 664 to read the values.

In one embodiment, the predetermined interval is 100 milliseconds, the predetermined amount is 5 milliseconds, and the correction amount is 1 millisecond. In this embodiment, if the average is greater than 105 milliseconds, the analog recorder 664 anticipates reading the values by 1 millisecond, and if the average is less than 95 milliseconds, the analog recorder 664 postpones reading the values by 1 millisecond. In embodiments, the anticipation and postponement for the analog recorder 664 to read the values is limited between 80 milliseconds and 120 milliseconds.

Depending on the setup of the control system 600, the HSR 660 uses either the time inferencer 667 or the direct time offsetter 668 to maintain the virtual time axis. If the date and time values for the controller 610 are available, the direct time offsetter 668 may be used. If the date and time values for the controller 610 are unavailable, the time inferencer 667 may be used.

The time inferencer 667 relies on the predetermined interval that the publisher 630 uses to update the tag timestamp. The time inferencer 667 performs a synchronization cycle on the start-up of the HSR 660 and then on a regular interval, such as every hour. The synchronization cycle of the time inferencer 667 includes reading the tag timestamp at a relatively high frequency, such as every 20 milliseconds. If the tag timestamp has changed, the time inferencer 667 sets a flag which, enables the reading of the tag timestamp and the assignation of the current time to the virtual time axis of the HSR 660 within the subsequent loop of the regular interval. When assigning the tag timestamp to the current time of the virtual time axis, the time inferencer compensates for the delay of waiting until the next loop of the cycle to read the tag timestamp and assign it to the current time of the virtual time axis.

The direct time offsetter 668 assigns the current value of the virtual time axis as the controller time plus a time interval. In some embodiments, this controller time is stored in the same analog array with the sensor values. The complete reading of the values of the sensor from the controller 610 by the analog recorder 664 may be split up into several sub-packets due to limitations in the data transfer packet size between the controller 610 and the HMI 650. The time interval may be determined by:

$$T_R = (T_F - T_I) * \left(\frac{1}{2} - \frac{n}{N}\right)$$

where $T_R$ is the time interval (which could have a negative value), $T_F$ is the time of the read response of the last packet, $T_I$ is the time of the read request of the first packet, n identifies the index of the sub-packet which contains the controller date and time, and N identifies the number of sub-packets which make up the complete array. In some embodiments, when the absolute value of the time interval is lower than a given threshold it will not be summed to the controller time. In some embodiments, this given threshold is 10 ms.

Control system 600 may also include an HMI data store 655. The HMI data store 655 may be used by the HMI 650 and its various processes to store, inter alia, the data read from the controller 610 and to store the virtual time axis.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Due to data storage limitations, turbine engine electronic data acquisition systems may not able to continually record high-frequency compressor rotor speed data for the operational lifetime of the gas turbine engine 100. However, high-frequency compressor rotor speed data can be beneficial to capture momentary speed excursions that can occur during gas turbine engine 100 operation events such as off-loads. Typically NGP of a gas turbine engine 100 is controlled to stay above 94% of the maximum design speed to limit emissions and below 100% of the maximum design speed to avoid structural failure of the compressor rotor. Being able to record data to identify characteristics of an overspeed event can provide useful information to address the factors that may have led to structural failure of a gas turbine component. For example, to address failure induced by modal excitation. Structural damage and failure can occur from NGP reaching a maximum magnitude, operating for prolonged periods above a specific NGP, and number of occurrences that NGP exceeded a specific NGP threshold.

Figure 3:
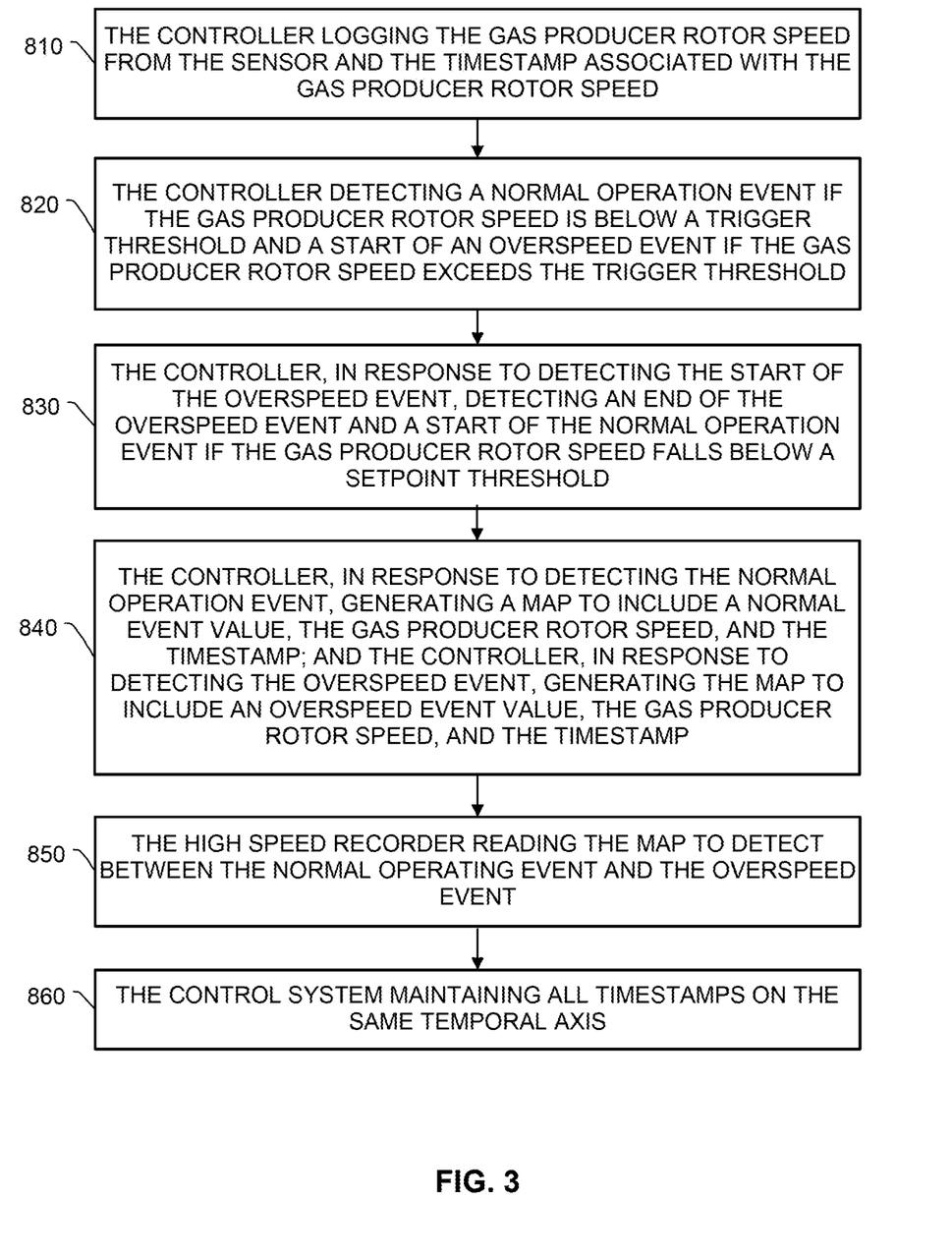
FIG. 3 is a flowchart of a method for recording information related to an overspeed event of the gas producer rotor of the gas turbine engine with the control system of FIGS. 1 and 2.

FIG. 3 is a flowchart of a method for recording information related to an overspeed event of the gas producer rotor of the gas turbine engine with the control system of FIGS. 1 and 2. The method begins at block 810 and includes the controller 610 logging the gas producer rotor speed from the sensor and the timestamp associated with the gas producer rotor speed based on the controller clock 640. Block 810 can include the controller 610, sampling the gas producer rotor speed from the sensor 22 connected to the gas turbine engine 100 on a predetermined sensor sampling interval.

Block 820 includes the controller detecting a normal operation event if the gas producer rotor speed is below a trigger threshold and a start of an overspeed event if the gas producer rotor speed exceeds the trigger threshold. In an embodiment there are multiple levels of overspeed events and the controller can detect the start of each overspeed level. For example the controller can detect a normal operation event if a gas producer rotor speed is below a trigger threshold, a start of a level one overspeed event if the gas producer rotor speed exceeds a level one trigger threshold, a start of a level two overspeed event if the gas producer rotor speed exceeds a level two trigger threshold, and start a level three overspeed event if the gas producer rotor speed exceed a level three trigger threshold.

Block 820 can include the publisher 630 of the controller 610, logging an array of the NGP values obtained from the shaft speed sensor 22 and the occurrence of each event. Block 820 may include logging the shaft speed sensor 22 values into an analog array. Block 820 may also include logging each event into an event array, which may include logging a unique identifier, and an event timestamp. The event timestamp may be the time of the controller clock 640 when the event occurred.

Block 830 includes the controller 610, in response to detecting the start of the overspeed event, detecting an end of the overspeed event and a start of the normal operation event if the gas producer rotor speed falls below a setpoint threshold. In an embodiment, there are multiple overspeed event levels, and the controller 610 can detect the end each overspeed event level. For example, the controller 610, in response to detecting the start of the level one overspeed event, detecting an end to the level one overspeed event if the gas producer rotor speed is less than a level one setpoint threshold; the controller 610, in response to detecting the start of the level two overspeed event, detecting an end to the level two overspeed event if the gas producer rotor speed is less than a level two setpoint threshold; and the controller 610, in response to detecting the start of the level three overspeed event, detecting an end to the level three overspeed event if the gas producer rotor speed is less than a level three setpoint threshold.

Block 840 includes the controller 610, in response to detecting the normal operation event, generating a tag to include a normal event value, the gas producer rotor speed, and the timestamp; and the controller 610, in response to detecting the overspeed event, generating the tag to include an overspeed event value, the gas producer rotor speed, and the timestamp.

In an embodiment, there are multiple overspeed event levels, and the controller 610 can generate tags based on each overspeed event level. For example the controller 610, in response to detecting the level one overspeed event, generating the tag to include a level one overspeed event value, the gas producer rotor speed, and the timestamp. The controller 610, in response to detecting the level two overspeed event, generating the tag to include the level one overspeed value, a level two overspeed event value, the gas producer rotor speed, and the timestamp. The controller 610, in response to detecting the level three overspeed event, generating the tag to include the level one overspeed value, the level two overspeed value, a level three overspeed event value, the gas producer rotor speed, and the timestamp.

Block 840 can include the publisher 630, publishing a tag of the event that occurred within the last timeframe of a predetermined tag publishing interval. Publishing the tag of the event may include updating a log to include the event that occurred within the last timeframe of the tag publishing interval. The published tag may include a tag timestamp that is the time of the controller clock 640 when the tag is published, and the information logged, such as the unique identifier, sensor value, and an offset, for the event that occurred within the last timeframe. The offset may be the difference in time between the event timestamp and the tag timestamp.

Block 850 includes the high speed recorder 660 reading the tag to detect between the normal operating event and the overspeed event. In an embodiment, there are multiple overspeed event levels, and the high speed recorder 660 can read the tag to detect between the normal operating event, the level one overspeed event, the level two overspeed event, and the level three overspeed event.

Block 850 can include the HSR 660 reading the tag after it is published and reading the values obtained from the shaft speed sensor from the controller 610, block 850 may include the event recorder 662 checking the tag at a predetermined tag reading interval to see if the tag has an overspeed event value. The predetermined tag reading interval being at a higher frequency than the predetermined tag publishing interval. Block 850 may also include the event recorder 662 setting a flag when the tag includes the overspeed event value and recording the entire tag. Block 850 may also include the analog recorder 664 reading the values obtained for each sensor from the controller 610 or the tag on a predetermined sensor reading interval or tag reading interval respectively. The sensor reading interval may be the same as the tag reading interval.

When reading data from a controller 610 by an HSR 660, aliasing may occur. By checking the tag at a relatively high frequency compared to the interval that the tag is published on and only reading the tag when the tag header has changed, the event recorder 662 ensures that the tag is only read once it is completely updated, but well ahead of the next change of the tag, which may prevent aliasing of the data.

Block 860 includes the high speed recorder 660, in response to detecting the overspeed event, records a plurality of tags including the overspeed event value, the gas producer rotor speed, the timestamp, from the start of the overspeed event to the end of the overspeed event. In an embodiment, there are multiple overspeed event levels, and the high speed recorder can, in response to detecting the level one overspeed event, record a plurality of tags including the level one overspeed event value, level two overspeed event value, and level three overspeed event value, the gas producer rotor speed, the timestamp.

The method can still further include the control system 600 maintaining all timestamps on the same temporal axis. The method may include the analog recorder 664 assigning a sensor timestamp relative to a virtual time axis to each value of the sensors obtained from the controller 610. The sensor timestamp may be assigned by subtracting the time on the virtual time axis that the values were received at the analog recorder 664 by half of the difference between the time on the virtual time axis the values were received at the analog recorder 664 and the time on the virtual time axis that the request to read the values was sent by the analog recorder 664.

The method may include the frequency regulator 666 correcting the predetermined sensor reading interval to account for latencies in the operating system of the HMI 650. Correcting the predetermined sensor reading interval may include maintaining an average cycle time between reading the values of the sensors over a predetermined number of cycles, increasing an actual predetermined sensor reading interval by a correction amount if the average is lower than a desired sensor reading interval by a predetermined amount, and decreasing the actual predetermined sensor reading interval by a correction amount if the average is higher than the desired sensor reading interval.

The method may also include the direct time offsetter 668 assigning the current value of the virtual time axis as the controller clock 640 time plus a packet reading interval when the date and time values for the controller clock 640 are available. The packet reading interval may be the difference of the time of the read response of the last packet and the time of the read request of the first packet multiplied by the difference of one-half minus the division of the index of the sub-packet which contains the controller clock 640 date and time by the number the number of sub-packets which make up the complete array. This interval may have a negative value. In some embodiments, when the absolute value of this interval is lower than a given threshold, it will not be summed to the controller time. In some embodiments, this threshold is half of the controller 610 cycle time.

The method may further include the time inferencer 667 performing a synchronization cycle at start-up of the HSR 660 and on a synchronization interval thereafter with the publisher 630 to establish the virtual time axis and the publisher 630 assigning the tag timestamp to the current time of the virtual time axis by compensating for the delay of waiting until the next loop of the cycle for the tag timestamp to be read when the controller clock 640 date and time are not available.

The method may still further include the monitoring system 700 obtaining the timestamped sensor and event data to monitor the gas turbine engine 100, to perform diagnostics on the gas turbine engine 100, to alert engineers and customers when certain events occur, and to recommend service of the gas turbine engine. Diagnostics may be performed by an engineer who analyzes the data to determine what, if any, service needs to be performed on the gas turbine engine 100. Monitoring and diagnosing the gas turbine engine 100 may include providing the raw data, various statistics, and warnings to engineers or to customers through a network. Diagnostics can also be performed by the monitoring system 700 or related remote systems that may use analytics to monitor and diagnose the gas turbine engine 100. In some embodiments, the data captured by the controller 610 is read by the HSR 660 and logged in batches. These batches may be obtained by the monitoring system 700. As in some other embodiments, the HSR 660 may be running in other devices connected to the controller. The batches may also be obtained by other monitoring systems.

As disclosed above, the HSR 660 can maintain a virtual time axis that maintains all of the data obtained by the HSR 660 on the time axis relative to the controller clock 640 of the controller 610 and on a synchronized virtual time axis when the controller clock 640 of the controller 610 is unavailable. Maintaining the virtual time axis may prevent time stamping contradictions and may prevent the need for an engineer to laboriously analyze the changes in digital states and the reviewing of events in various event logs.

Those of skill will appreciate that the various illustrative logical blocks and algorithm steps described in connection with the embodiments disclosed herein can be implemented as electronic hardware, computer software, software modules, or combinations thereof. To clearly illustrate this interchangeability of hardware and software, various illustrative components, blocks, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a block or step is for ease of description. Specific functions or steps can be moved from one block without departing from the invention.

The various illustrative logical blocks described in connection with the embodiments disclosed herein can be implemented or performed with a general purpose processor, a digital signal processor (DSP), application specific integrated circuit (ASIC), a field programmable gate array (FPGA) or other programmable logic devices, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in software executed by a processor (e.g., of a computer), or in a combination of the two. The software can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A method of monitoring a gas turbine engine, the method comprising:

logging a gas producer rotor speed obtained from a sensor and a timestamp associated with the gas producer rotor speed;

detecting a start of an overspeed event if the gas producer rotor speed exceeds a trigger threshold;

in response to detecting the start of the overspeed event, detecting an end of the overspeed event if the gas producer rotor speed falls below a setpoint threshold;

in response to detecting the overspeed event, generating a tag to include an overspeed event value, the gas producer rotor speed, and the timestamp;

reading the tag which includes the overspeed event value; and in response to reading the tag which includes the overspeed event value, recording a plurality of tags including the overspeed event value, the gas producer rotor speed, the timestamp, from the start of the overspeed event to the end of the overspeed event.

2. The method of claim 1, wherein the method further comprises in response to detecting the end of the overspeed event, recording a plurality of tags including the gas producer rotor speed, and the timestamp after the overspeed event.

3. The method of claim 2, wherein the method further comprises temporarily storing a plurality of tags including the gas producer rotor speed, and tag timestamp and in response to the start of the overspeed event, recording the gas producer rotor speed, and the timestamp from prior to the start of the overspeed event.

4. The method of claim 1, wherein the method further comprises incrementing a counter by one for each overspeed event recorded during operation of the gas turbine engine.

5. The method of claim 1, wherein the method further comprises determining a cumulative overspeed event duration by summing a difference between the timestamp from the start of the overspeed event and the timestamp from the end of the overspeed event of each overspeed event recorded during operation of the gas turbine engine.

6. The method of claim 1, wherein the method further comprises recording the maximum gas producer rotor speed between the start of the overspeed event and the end of the overspeed event.

7. The method of claim 1, wherein the setpoint threshold is generally 0.5% less than the trigger threshold.

8. A method of monitoring a gas turbine engine, the method comprising:

logging a gas producer rotor speed obtained from a sensor and a timestamp associated with the gas producer rotor speed;

detecting a start of a level one overspeed event if the gas producer rotor speed exceeds a level one trigger threshold, a start of a level two overspeed event if the gas producer rotor speed exceeds a level two trigger threshold, and start a level three overspeed event if the gas producer rotor speed exceeds a level three trigger threshold, in response to detecting the start of the level one overspeed event, detecting an end to the level one overspeed event if the gas producer rotor speed is less than a level one setpoint threshold;

in response to detecting the start of the level two overspeed event, detecting an end to the level two overspeed event if the gas producer rotor speed is less than a level two setpoint threshold;

in response to detecting the start of the level three overspeed event, detecting an end to the level three overspeed event if the gas producer rotor speed is less than a level three setpoint threshold;

in response to detecting the level one overspeed event, generating a tag to include a level one overspeed event value, the gas producer rotor speed, and the timestamp;

in response to detecting the level two overspeed event, generating the tag to include the level one overspeed value, a level two overspeed event value, the gas producer rotor speed, and the timestamp;

in response to detecting the level three overspeed event, generating the tag to include the level one overspeed value, the level two overspeed value, a level three overspeed event value, the gas producer rotor speed, and the timestamp;

reading a plurality of tags which include the level one overspeed event value, the level two overspeed event value, and the level three overspeed event value; and in response to reading the plurality of tags, recording a plurality of tags including the level one overspeed event value, level two overspeed event value, level three overspeed event value, the gas producer rotor speed, and the timestamp.

9. The method of claim 8, wherein the method further comprises, in response to detecting the end of the level one overspeed event, recording a plurality of tags including the gas producer rotor speed, and timestamp for generally fifteen minutes after the level one overspeed event.

10. The method of claim 9, wherein the method further comprises temporarily storing a plurality of tags including the gas producer rotor speed, and timestamp and, in response to the start of the level one overspeed event, recording the gas producer rotor speed, and timestamp from generally one minute prior to the start of the level one overspeed event.

11. The method of claim 8, the method further comprises incrementing a level one counter by one for each level one overspeed event recorded during operation of the gas turbine engine, a level two counter by one for each level two overspeed event recorded during operation of the gas turbine engine, and a level three counter by one for each level three overspeed event recorded during operation of the gas turbine engine.

12. The method of claim 8, wherein the method further comprises determining a cumulative level one overspeed event duration by summing a difference between the timestamp from the start of the level one overspeed event and the timestamp from the end of the level one overspeed event of each level overspeed event recorded during operation of the gas turbine engine, a cumulative level two overspeed event duration by summing a difference between the timestamp from the start of the level two overspeed event and the timestamp from the end of the level two overspeed event of each level two overspeed event recorded during operation of the gas turbine engine, and a cumulative level three overspeed event duration by summing a difference between the timestamp from the start of the level three overspeed event and the timestamp from the end of the level three overspeed event of each overspeed event recorded during operation of the gas turbine engine.

13. The method of claim 8, the method further comprises recording the maximum gas producer rotor speed between the start of the level overspeed event and the end of the level overspeed event.

14. The method of claim 8, wherein the level one trigger threshold is generally 101.5% of a maximum design speed, the level one setpoint threshold is generally 101% of the maximum design speed, the level two trigger threshold is generally 103.75% of the maximum design speed, the level two setpoint threshold is generally 103.25% of the maximum design speed, the level three trigger threshold is generally 105% of the maximum design speed, and the level three setpoint threshold is generally 104.5% of the maximum design speed.

15. A control system for monitoring a gas turbine engine, the control system comprising:
a sensor connected to the gas turbine engine;
one or more processors configured to
log a gas producer rotor speed obtained from the sensor and a timestamp associated with the gas producer rotor speed;
detect a start of an overspeed event if the gas producer rotor speed exceeds a trigger threshold;
in response to detecting the start of the overspeed event, detect an end of the overspeed event if the gas producer rotor speed falls below a setpoint threshold;
in response to detecting the overspeed event, generate the tag to include an overspeed event value, the gas producer rotor speed, and the timestamp;
read the tag including the overspeed event value; and
in response to reading the tag, record a plurality of tags including the overspeed event value, the gas producer rotor speed, and the timestamp, from the start of the overspeed event to the end of the overspeed event.

16. The control system of claim 15, wherein the one or more processors are configured to in response to detecting the end of the overspeed event, record a plurality of tags including the gas producer rotor speed, and the timestamp for generally fifteen minutes after the overspeed event.

17. The control system of claim 16, wherein the one or more processors are configured to temporarily store a plurality of tags including the gas producer rotor speed, and timestamp and in response to the start of the overspeed event, recording the gas producer rotor speed, and the timestamp from generally one minute prior to the start of the overspeed event.

18. The control system of claim 15, wherein the one or more processors are configured to increment a counter by one for each overspeed event recorded during operation of the gas turbine engine.

19. The control system of claim 15, wherein the one or more processors are configured to determine a cumulative overspeed event duration by summing a difference between the timestamp from the start of the overspeed event and the timestamp from the end of the overspeed event of each overspeed event recorded during operation of the gas turbine engine.

20. The control system of claim 15, wherein the setpoint threshold is generally 0.5% less than the trigger threshold.

* * * * *